United States Patent [19]

Emery

[11] 4,399,754
[45] Aug. 23, 1983

[54] LAMINATED WOOD CORNER STRUCTURE FOR FURNITURE

[75] Inventor: Francis Emery, Atlanta, Ga.

[73] Assignee: C I Designs, Inc., Medford, Mass.

[21] Appl. No.: 297,226

[22] Filed: Aug. 28, 1981

[51] Int. Cl.³ .............................................. A47B 3/06
[52] U.S. Cl. .................................. 108/159; 108/161;
144/350; 144/351; 156/196; 156/264
[58] Field of Search .............................. 108/159, 161;
248/188.1; 297/455-457; 403/231; 156/196,
264, 256, 258; 144/346, 349, 350, 351

[56] References Cited

U.S. PATENT DOCUMENTS

| | | | |
|---|---|---|---|
| 1,385,387 | 7/1921 | Morandi . | |
| 2,245,497 | 6/1941 | Potchen . | |
| 2,364,849 | 12/1944 | Ibbotson et al. | 156/258 X |
| 2,382,208 | 8/1945 | Corbin | 156/264 X |
| 2,717,815 | 9/1955 | Hubbard | 108/161 |
| 2,813,560 | 11/1957 | Batts | 144/351 |
| 3,188,693 | 6/1965 | Troyano . | |
| 4,003,535 | 1/1977 | Tianchon | 248/188.1 X |
| 4,039,133 | 8/1977 | Streicher | 248/188.8 |
| 4,216,255 | 8/1980 | Lever | 428/57 |
| 4,290,371 | 9/1981 | Snitzer et al. | 108/159 |

Primary Examiner—William E. Lyddane

Attorney, Agent, or Firm—Kenway & Jenney

[57] ABSTRACT

Disclosed is a laminated wood corner construction for furniture and a method for preparing such a construction. The corner construction comprises two laminated wood legs bent at 90° angles, bisected on a 45° diagonal throughout their length and glued together and a laminated wood connecting piece bent at a 90° angle, bisected on a 45° diagonal throughout its length and glued between the upper bent portions of the legs. The angle between the upper bent portions of the two laminated wood legs is a right angle. A method for preparing a corner construction comprising the following steps: (a) taking thin wood laminae, applying glue and assembling the laminae with a right angle bend; (b) clamping the laminae in a mold while the glue hardens; (c) cutting the molded sheets into strips; (d) bisecting each strip on a 45° diagonal throughout its length; (e) taking two bisected strips and gluing them together with the upper bent portions running at right angles to each other; (f) taking a shorter bisected strip and gluing it between the upper bent portions of the two longer strips; (g) rounding off the ends of the two longer strips by conventional means; (h) cutting a recess into the shorter strip in order to inset a top made of glass or other material.

15 Claims, 13 Drawing Figures

U.S. Patent Aug. 23, 1983 4,399,754
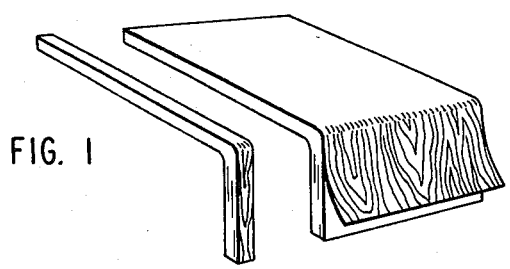
FIG. 1
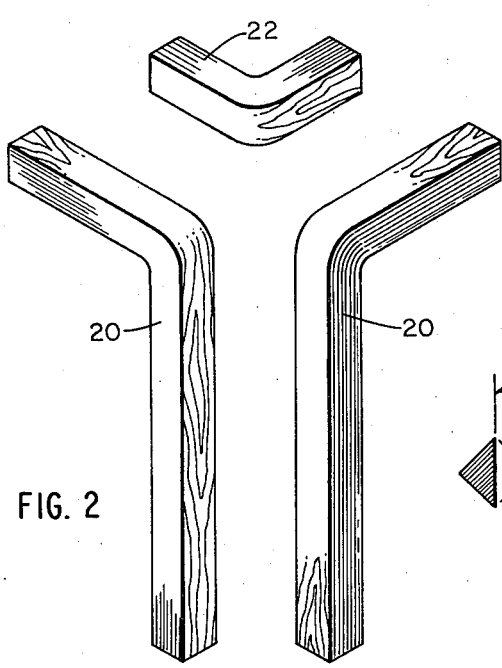
FIG. 2
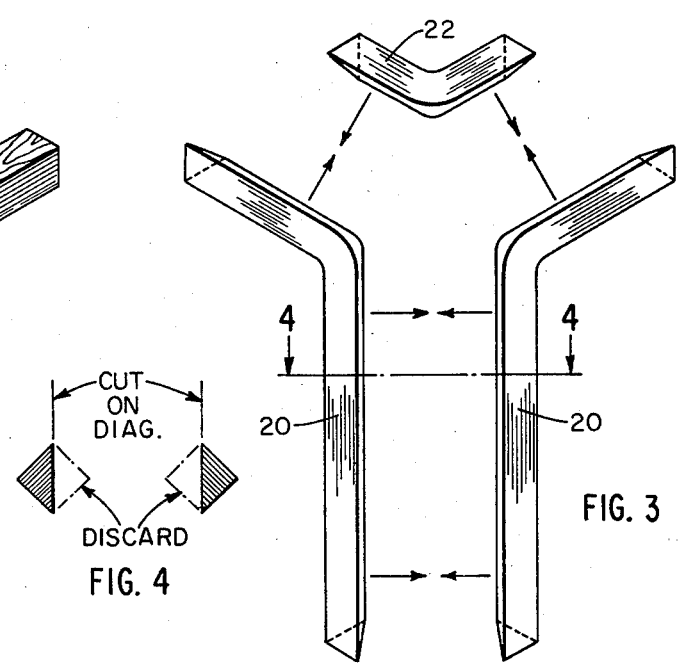
FIG. 3
FIG. 4
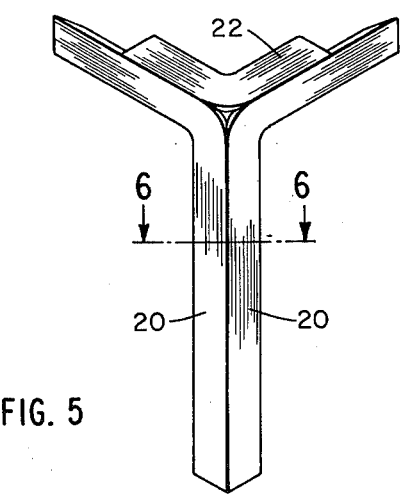
FIG. 5
FIG. 6
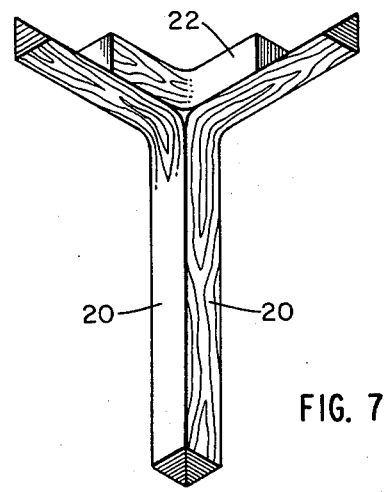
FIG. 7

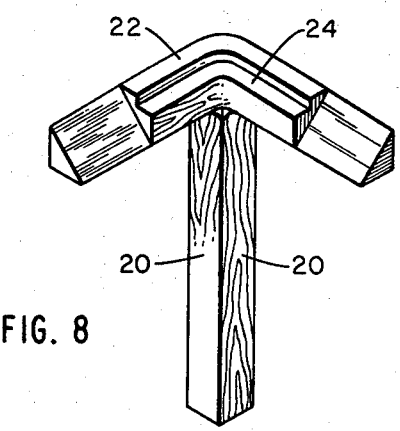
FIG. 8
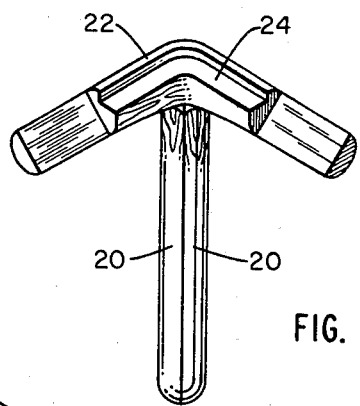
FIG. 9
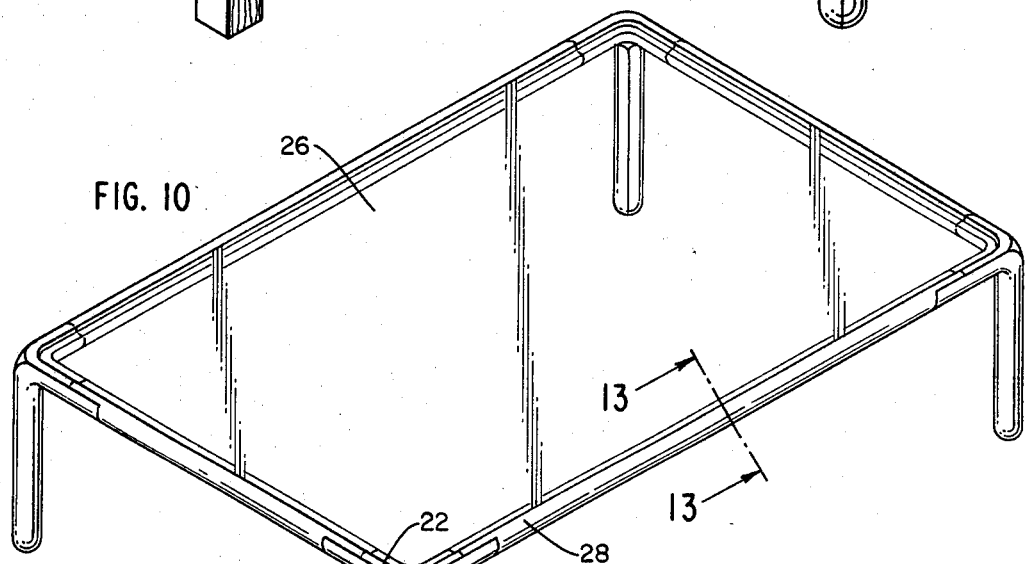
FIG. 10
FIG. 11
FIG. 12
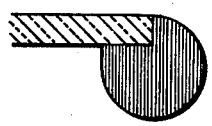
FIG. 13

LAMINATED WOOD CORNER STRUCTURE FOR FURNITURE

BACKGROUND OF THE INVENTION

This invention relates to a structural element for three-dimensional objects, and a method for making such an element. More particularly, this invention relates to a laminated wood corner construction which will accommodate a wide range of structural formations such as tables, chairs, beds, sofas and desks.

In furniture of a type having a supporting frame, it is of utmost importance that the frame possess sufficient strength and rigidity. It is therefore a principal object of the invention to provide a corner construction that is both strong and rigid.

Another object of the invention is to provide a highly durable corner construction which is economic to manufacture.

Another object of the invention is to provide a corner construction that is attractive in appearance.

SUMMARY OF THE INVENTION

The instant invention comprises a laminated wood corner construction for three-dimensional objects, e.g. furniture, and a method for preparing such a construction. The construction comprises two laminated wood legs bent at 90° angles, cut on an angle throughout their lengths, and joined together and a laminated wood connecting piece bent at a 90° angle, cut on an angle throughout its length and affixed between the upper bent portions of the legs. The angle between the upper bent portions of the two legs is less than 180°.

In a preferred form, the legs and the connecting piece are bisected on a 45° diagonal throughout their lengths. The preferred angle between the upper bent portions of the two legs is 90°. The legs are joined together using glue and the connecting piece is joined to the legs using glue.

A method for preparing a laminated wood corner construction comprises the following steps: (1) taking thin wood laminae, applying glue and assembling the laminae with a right angle bend; (2) clamping the laminae in a mold while the glue hardens; (3) cutting the molded sheets into strips; (4) cutting each strip on an angle throughout its length; (5) taking two strips, the legs, and joining them together, with the angle between the upper bent portions of the legs being less than 180°; (6) taking a shorter strip, the connecting piece, and attaching it between the upper bent portions of the legs.

In a preferred method, the strips of step 4 are bisected on a 45° diagonal throughout their lengths. The preferred angle between the upper bent portions of the two legs is 90°. The legs are joined together using glue and the connecting piece is joined to the legs using glue. The ends of the legs may be rounded off by conventional means in order to create a more attractive appearance. When the corner construction is employed in a table, one of the articles most suited to the invention, a recess may be cut into the connecting piece in order that a glass top or top of other material can be inset.

These and other objects and features of the invention will be apparent from the following description of a preferred embodiment and from the drawing.

BRIEF DESCRIPTION OF THE DRAWINGS

FIG. 1 is a perspective view of a laminated wood sheet and a strip cut from the sheet;

FIG. 2 is a perspective view of three laminated wood strips, two legs and a connecting piece, cut from the laminated sheet of FIG. 1;

FIG. 3 is a perspective view of the two legs and connecting piece of FIG. 2 bisected on a 45° diagonal throughout their lengths;

FIG. 4 is a cross sectional view taken along section line 4 of FIG. 3;

FIG. 5 is a perspective view of the two legs and connecting piece of FIG. 3 assembled to form the corner construction embodying the invention;

FIG. 6 is a cross sectional view taken along section line 6 of FIG. 5;

FIG. 7 is a perspective view of a corner construction embodying the invention;

FIG. 8 is a perspective view of a corner construction embodying the invention in which a recess is cut into the connecting piece;

FIG. 9 is a view similar to that of FIG. 8 in which the ends of the legs are rounded off;

FIG. 10 is a perspective view of a rectangular glass table employing the corner construction of FIG. 9;

FIG. 11 is a perspective view of a horizontal side member of a table before it is connected to corner constructions to form the frame of the table;

FIG. 12 is a detailed view of FIG. 11; and

FIG. 13 is a cross sectional view taken along section line 13 of FIG. 10.

DESCRIPTION OF THE PREFERRED EMBODIMENT

Referring to FIG. 1, there is shown a molded sheet of wood laminae and a strip cut from the molded sheet. This molded sheet is formed by taking many thin wood laminae from any type of wood, applying glue, and then heat treating the laminae in order to assemble them with a right angle bend. The laminae are clamped into a mold while the glue hardens and the molded sheets are then cut into strips about three inches square. By reason of this laminated construction, the grain of the wood runs the proper way at every point of strain, and is not liable to shift.

Referring to FIG. 2, there is shown the two legs 20 and the connecting piece 22 which are laminated wood strips cut from the molded sheet of FIG. 1. As seen in FIGS. 3 and 4, the two legs 20, and the connecting piece 22 are bisected on a 45° diagonal throughout their lengths.

FIGS. 5 and 7 show the two bisected legs 20 glued together with their upper bent portions running at right angles to each other and the bisected connecting piece 22 glued between the upper bent portions of the two legs 20.

FIG. 8 is a variation of the corner construction of FIG. 7. Here, there is a recess 24 cut into the connecting piece 22 in order that a glass top or top of other material can be inset to complete a table or other piece of furniture. The corner construction of FIG. 9 is identical to that of FIG. 8, except that the ends of the legs are rounded off by conventional means. The legs may be either square or rounded off. The rounding off is just to create a more attractive appearance.

Referring to FIG. 10, there is shown a generally rectangular table having a transparent glass top 26 supported by a frame. The frame is comprised of four horizontal side members 28 (see FIGS. 11 and 12) interconnected with the four corner constructions of FIG. 9.

While this invention has been described with reference to its preferred embodiment, other embodiments can achieve the same result. Variations and modifications of the present invention will be obvious to those skilled in the art and it is intended to cover in the appended claims all such modifications and equivalents as fall within the true spirit and scope of this invention.

I claim:

1. A corner construction for erecting furniture comprising two laminated wood legs bent at a 90° angle, cut on an angle throughout their lengths, and joined together, the angle between the upper bent portions of the legs being less than 180°, and a laminated wood connecting piece bent at a 90° angle, cut on an angle throughout its length and affixed between the upper bent portions of the two legs.

2. The corner construction according to claim 1 wherein the legs are joined together using glue and the connecting piece is joined to the legs using glue.

3. The corner construction according to claim 1, wherein the legs and the connecting piece are bisected on a 45° diagonal throughout their length.

4. The corner construction according to claim 1, wherein the angle between the two upper bent portions of the laminated wood legs is 90°.

5. A table comprising a horizontal portion and a frame, said frame comprising four horizontal side members interconnected with four corner constructions wherein the improvement is characterized by a corner construction comprising two laminated wood legs bent at a 90° angle, cut on an angle throughout their lengths, and joined together, the angle between the upper bent portions of the legs being less than 180°, and a laminated wood connecting piece bent at a 90° angle, cut on an angle throughout its length, and affixed between the upper bent portions of the legs.

6. The table of claim 5 wherein the legs are joined together using glue and the connecting piece is joined to the legs using glue.

7. The table of claim 5 wherein the legs and the connecting piece are bisected on a 45° diagonal throughout their length.

8. The table of claim 5 wherein the angle between the two upper bent portions of the laminated legs is 90°.

9. A process for preparing a corner construction comprising the following steps:
    (a) taking thin wood laminae, applying glue and assembling the laminae with a right angle bend,
    (b) clamping the laminae in a mold while the glue hardens,
    (c) cutting the molded sheets into strips,
    (d) cutting each strip on an angle throughout its length,
    (e) taking two strips of step (d), the legs, and joining them together with the angle between the upper bent portions of the legs being less than 180°,
    (f) taking a shorter strip of step (d), the connecting piece, and attaching it between the upper bent portions of the legs.

10. The process as set forth in claim 9 wherein the laminae are heat treated in order to assemble them with a right angle bend.

11. The process as set forth in claim 9 wherein the legs are joined together using glue and the connecting piece is joined to the legs using glue.

12. The process as set forth in claim 9 wherein the legs and the connecting piece are bisected on a 45° diagonal throughout their lengths.

13. The process as set forth in claim 9 wherein the angle between the two upper bent portions of the legs is 90°.

14. The process as set forth in claim 9, wherein the ends of the legs are rounded off by conventional means.

15. The process as set forth in claim 9 wherein a recess is cut into the connecting piece in order that a glass top or top of other material can be inset.

* * * * *